United States Patent [19]

Woods

[11] Patent Number: 4,894,903

[45] Date of Patent: Jan. 23, 1990

[54] ASSEMBLY JIG AND METHOD FOR MAKING WING PANELS

[75] Inventor: Quentin T. Woods, Woodinville, Wash.

[73] Assignee: The Boeing Company, Seattle, Wash.

[21] Appl. No.: 216,702

[22] Filed: Jul. 6, 1988

[51] Int. Cl.$^4$ .......................... B25B 1/20; B23P 11/00
[52] U.S. Cl. ................................ 29/448; 29/559; 269/43; 269/131
[58] Field of Search .................... 29/448, 559; 269/37, 269/43 X, 131 X, 130; 244/124

[56] References Cited

U.S. PATENT DOCUMENTS

| 1,949,007 | 2/1934 | Butler | 33/645 X |
|---|---|---|---|
| 2,110,752 | 3/1938 | Wright | 29/448 |
| 2,355,997 | 8/1944 | Mueller et al. | 78/49 |
| 2,364,494 | 12/1944 | Upson | 29/84 |
| 2,386,018 | 10/1945 | Watter | 29/148.2 |
| 2,403,569 | 7/1946 | Watter | 244/124 |
| 2,430,438 | 11/1947 | Watter et al. | 29/148.2 |
| 2,441,858 | 5/1948 | Watter | 29/148.2 |
| 2,451,454 | 10/1948 | Watter | 29/148.2 |
| 2,451,458 | 10/1948 | Watter | 244/124 |
| 2,558,819 | 7/1951 | Chausson | 244/124 |
| 2,567,124 | 9/1951 | Roberts | 244/124 |
| 2,615,234 | 10/1952 | Dumbleton | 29/148.2 |
| 2,959,333 | 11/1960 | Pavlecka | 244/124 |
| 3,052,120 | 9/1962 | Guyer, Jr. | 78/49 |
| 3,093,017 | 6/1963 | White | 78/49 |
| 3,113,373 | 12/1963 | Guyer, Jr. | 29/155 |
| 3,163,057 | 12/1964 | Drummond et al. | 77/32.2 |
| 3,427,518 | 2/1969 | Cloup | 318/18 |
| 3,429,023 | 2/1969 | Blythe et al. | 29/404 |
| 3,507,025 | 4/1970 | Ankeney | 29/155 |
| 3,534,896 | 10/1970 | Speller et al. | 227/51 |
| 3,559,256 | 2/1971 | Lemelson | 29/33 |
| 3,643,900 | 2/1972 | Maloney | 244/123 |
| 3,827,661 | 8/1974 | Ryan et al. | 244/123 |
| 3,935,633 | 2/1976 | Bunker | 29/559 |
| 3,973,766 | 8/1976 | Heath | 269/43 |
| 3,973,859 | 8/1976 | Huber et al. | 408/12 |
| 4,203,204 | 5/1980 | Murphy | 29/703 |
| 4,310,964 | 1/1982 | Murphy | 29/469 |
| 4,337,560 | 7/1982 | Slysh | 29/155 |
| 4,356,616 | 11/1982 | Scott | 29/526 |
| 4,381,104 | 4/1983 | Nelsen | 269/43 |
| 4,383,680 | 5/1983 | Braceland | 269/43 |
| 4,481,703 | 11/1984 | Scott | 29/526 |

Primary Examiner—Joseph M. Gorski
Attorney, Agent, or Firm—Bruce A. Kaser

[57] ABSTRACT

A jig is provided for assembling various different wing skin panels, all having different airfoil profiles. The jig includes a frame that has a plurality of colinear attachment points. These points define a center line axis that is generic for any panel assembled on the jig. A set of headers is distributed along the attachment points, such set being replaceable by another for a different panel. The headers have edge recesses in which are placed the panels' stringers. Both stringers and headers are covered by a skin sheet which is held in place by webbings that are pulled and tightened against the skin. The webbings hold the skin against the stringers while the stringers, skin, and headers are moved to a fastening location where the skin is riveted or otherwise fastened to the stringers.

1 Claim, 8 Drawing Sheets

ASSEMBLY JIG AND METHOD FOR MAKING WING PANELS

TECHNICAL FIELD

This invention relates to assembly jigs designed for making major structural components of aircraft in a production environment, and more particularly, jigs which are used to make wing parts.

BACKGROUND ART

Aircraft wings are unique geometric structures whose design is directly related to the unique size, payload requirements and purposes of the particular airplanes which employ them. Consistent with this uniqueness, the manufacturer of a given wing design requires the creation of unique and dedicated tooling, typically in the form of assembly jigs and fixtures, for example, and permanent production facilities to manufacture a given wing design. Further, such unique tooling and production facilities must be maintained and retained over the production life span of the airplane. An aircraft manufacturing firm that makes a fleet of aircraft must provide and maintain separate tooling and facilities for each airplane's left and right-hand wing. The investment for new tooling and facilities for each new airplane design commonly exceeds many millions of dollars. For this reason, when a manufacturer is considering instigating a new design, or to make a variant on an existing design, the decision to make the new plane is always influenced by the sizable amount of initial investment required to build new tooling and facilities.

In addition to initial investment, another economic factor associated with existing wing manufacturing techniques is the degree of automation and accessories used in connection with basic tooling, which influences direct labor reductions, quality improvements, and indirect costs. All of these represent ongoing costs to the manufacturer, which are added over and above the initial investment cost of producing tooling and facilities for wing production. The initial investment plus the ongoing costs must be justified by a production/sales rate for each airplane design under consideration, in order to make the design economically feasible or, in other words, profitable.

The invention described herein provides a "generic" or universal wing panel jig that is capable of producing any wing panel for any aircraft, including left and right-hand panels. Aside from the initial investment costs addressed above, the generic wing panel jig disclosed herein also reduces direct and indirect ongoing manufacturing costs and improves the quality and structural integrity of any wing panel manufactured by using the jig, at least in comparison to currently-known wide panel manufacturing methods.

Having "generic" tooling provides the manufacturer with the capability of building any wing by using only one set of tooling. This eliminates duplication in tooling and greatly reduces floor space and other facility requirements. Further, the generic tooling described herein can be amortized over an entire fleet of different airplane models, instead of a single model, which greatly benefits the manufacturer's ability to significantly reduce costs and therefore to compete against overseas competitors who may enjoy reduced labor rates or government subsidies common to other, more socialist forms of governments than we have here in the United States.

DISCLOSURE OF THE INVENTION

The present invention provides an assembly jig which can be used to construct any type or size of wing skin panel subassembly. As a person skilled in the art would know, the typical skin panel assembly is constructed of a plurality of elongated stringers over which a sheet of skin, typically made of a metallic or composite material, is fastened. The fastened assembly of stringers and skin has a certain airfoil curvature which is dedicated to a particular wing. As would be familiar, the fastened assembly is installed as the surface of a completed wing, which is typically done at a wing major assembly jig. As would also be familiar, each wing requires right-hand upper and lower as well as left-hand upper and lower skin panel assemblies, and the invention has the capability to construct any and all of these as may be required.

Generally, the invention includes a set of headers that includes individual headers which are releasably attached to a frame. More specifically, each individual header of a particular set is attached to a separate post on the frame. All of the headers have a curved panel-forming edge shaped to form a portion of the skin panel's profile. The headers are distributed along the length of the frame in a manner so that the set cooperatively defines the panel's complete profile.

One set of headers on the frame may be replaced by another, the second set being designed to construct a completely different panel. Regardless of the particular set used, the headers of any and all sets are attached to the frame's posts at the same location or attachment point on the posts. These points are colinear with respect to each other and define an imaginary axis which represents a generic centerline axis for any and all skin panels that are to be assembled on the jig.

During panel constrcution, and after a particular set of headers for that panel is attached to the frame, a number of stringers are then placed transversely across the headers and extend generally lengthwise from what would be the wing's root to its tip. The stringers are held in place in exact orientation across the headers by specially-shaped recessed areas that are distributed along and in the edge of each header. As would be known, there are different forms of stringers, some having a "Z"-type cross-section and others have a "U"-type cross-section. Even so, virtually every stringer has a top flange surface that extends along its entire length, the purpose of which is to provide a surface to which the skin can be fastened by conventionally known rivet-type fasteners. The previously mentioned edge recesses in each header hold the stringers across the header so that each stringer's fastening surface is essentially contiguous with the header's edge. Each header has a clamping device positioned adjacent each recess which fixedly holds the stringer in exact or true orientation.

After the stringers are placed across the headers and clamped in position, they are then covered by a preformed wing skin that is held in place by webbings or straps placed adjacent each header. These are tightened over the skin'ss outer surface by means of a pair of web attachment spools, one pair for each header, that are located at opposite ends of the header. Opposite ends of the webbing are connected to the spools. One spool is rotatable in a fashion such that it can be tightened in one direction, thus tightening the webbing. Since the jig has one tightened webbing for each header in the set, all of the webbings cooperate to hold the skin against the stringers and headers. This locates the skin surface as well as stringer position relative to the skin, and the spacing of the stringers relative to neighboring stringers. Further, the skin is placed in normalized contact with the top flange surface and edges of each stringer and header, respectively.

After the webbings have been tightened, the subassembly of headers, stringers and skin is removed from the frame and transported to another location where the skin is then fastened to the stringers. Since the webbings hold the skin to the headers, no tack fasteners are required prior to or during transport. Further, the webbings maintain normality between the skin and stringers during fastening and also permit the stringers to freely elongate relative to the skin as a result of part expansion which occurs during the typical interference fastener installation. The result is that induced stresses in the assembled panel are eliminated; and torsional twisting of individual stringers is eliminated, if desired, although it should be appreciated in certain situations it may be desirable to induce a twist in a particular stringer by properly locating and shaping certain header recesses. All of these factors result in substantial elimination of contour deviations in the completed skin panel assembly.

An important advantage of the invention is that it provides an improved way for making wing skin panel assemblies that results in finished panels that have higher structural integrity and fatique life. Another important advantage is that use of the invention will result in significant reductions in both direct and indirect manufacturing costs. As mentioned previously, not only will the invention reduce or eliminate unnecessary duplication in tooling, floor space and/or facilities, its use also creates significant cost avoidance for new designs, and specifically, eliminates the need to design, build and install new jigs for subsequent wing designs. An associated advantage to this is that certain low sales volume airplanes can continue to be produced without a cost penalty. For example, the Boeing 727 is no longer produced today because its dedicated tooling has been eliminated. Nevertheless, there are still many 727s in use. It would be possible to produce new wings as needed for the current 727 fleet by using the present invention, at no additional cost penalty to the manufacturer.

These advantages, and other, will become more apparent upon reading the remaining description taken in conjunction with the drawings.

BRIEF DESCRIPTION OF THE DRAWINGS

In the drawings, like reference numerals and letters refer to like parts throughout the various views, and wherein:

FIG. 4 is a view like FIGS. 2 and 3, but shows a set of headers mounted to the frame;

BEST MODE FOR CARRYING OUT THE INVENTION

Figure 3:
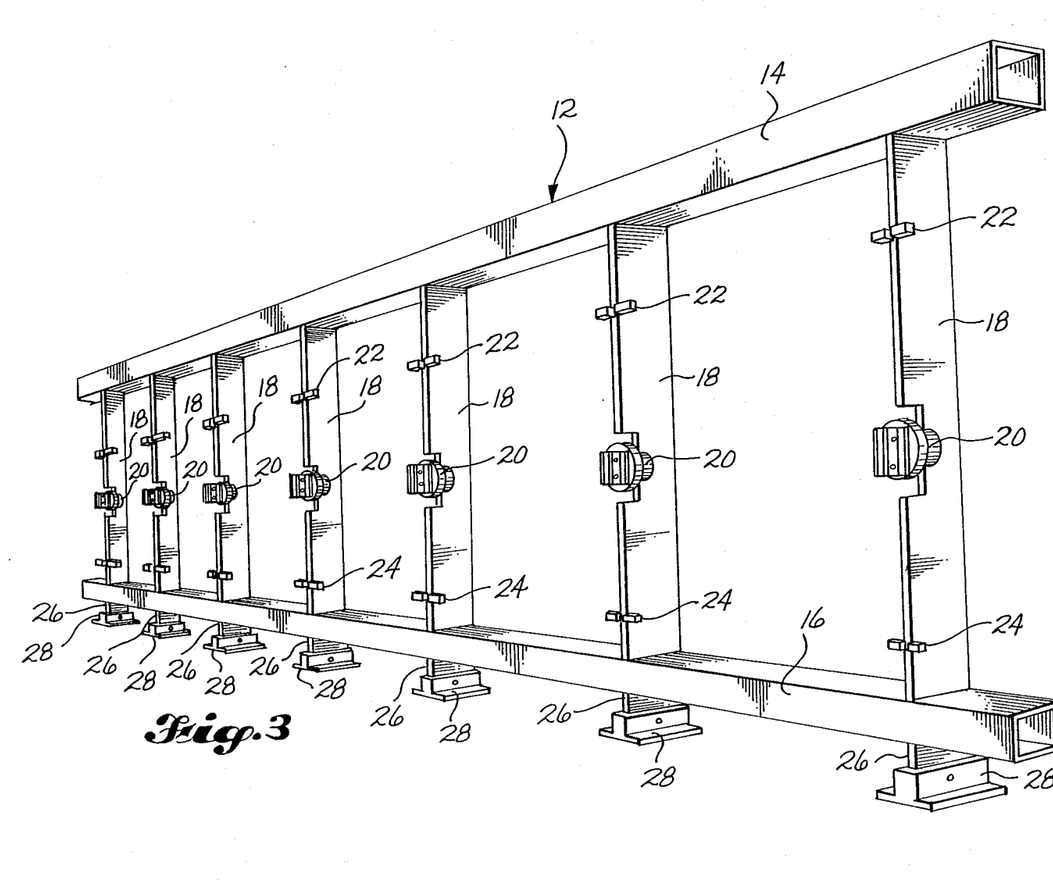
FIG. 3 is view like FIG. 2 but shows the frame with the other components of the jig removed, and shows where the jig is attached to the frame.

Referring now to the drawings, therein is shown at 10 a skin panel assembly jig constructed in accordance with a preferred embodiment of the invention. The jig includes a frame 12 (see FIG. 3) having a pair of horizontal rails 14, 16 and a plurality of vertical posts, each of which is indicated by reference numeral 18. Each post has an attachment device 20, which will be further described later, and slotted guide members 22, 24, one on each side of the attachment point. Connected to the frame'ss bottom rail 16 are a plurality of downwardly depending legs 26 which are received in footings 28 that are further mounted to a particular floor space.

Figures 7, 8, 9, 10:
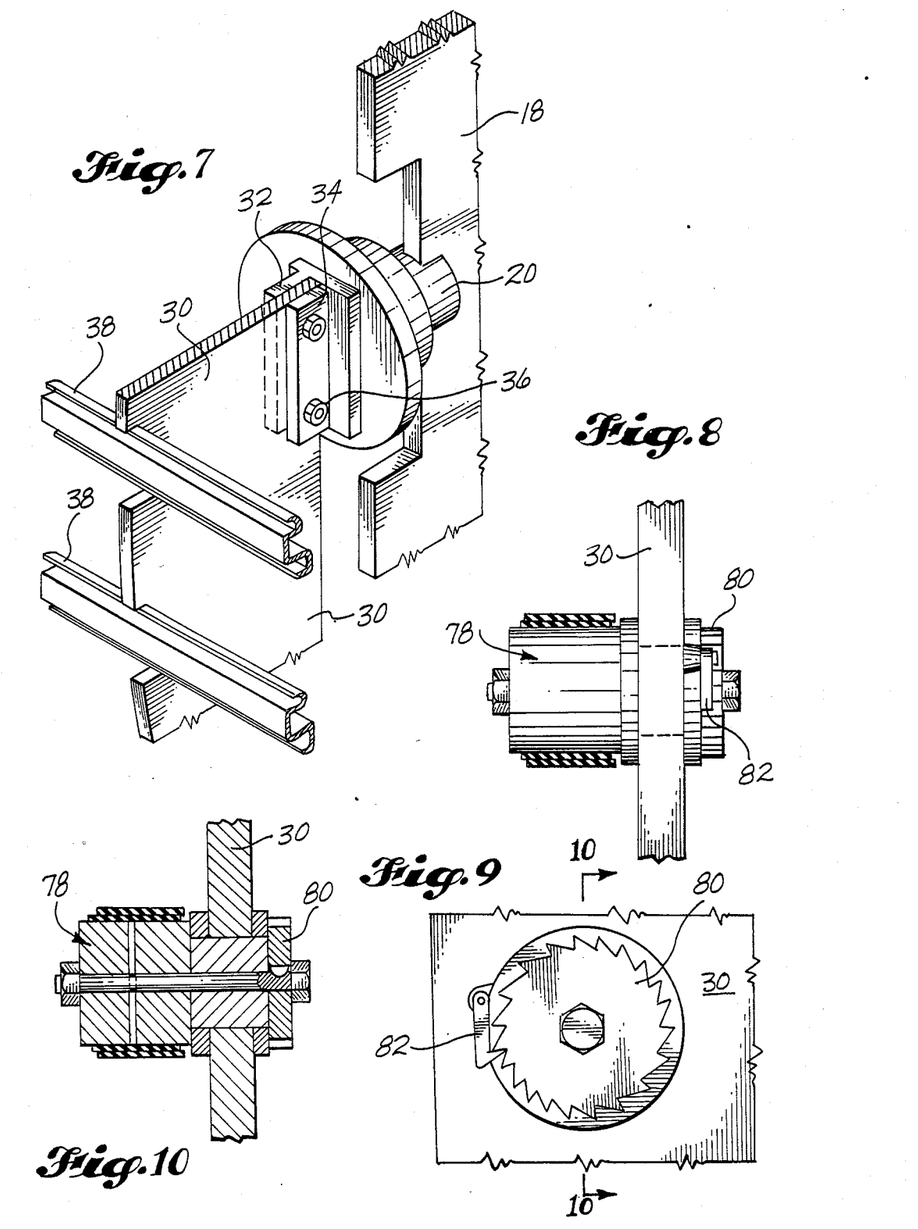
FIG. 7 is an enlarged fragmentary pictorial view which shows an attachment point or attachment member where a header is connected to a frame post.
FIG. 8 is a top view of a tightening spool which pulls one end of a webbing against the panel's skin sheet.
FIG. 9 is a right-hand end view of the spool shown in FIG. 10.
FIG. 10 is a cross-sectional view of the spool shown in FIGS. 8 and 9, and is taken along line 10—10 in FIG. 9.

Referring now to FIG. 4, when it is desired to build a particular skin panel, a set of headers for that panel are first mounted to the frame's posts 18. In the drawings, reference numeral 30 is used to indicate each and every header in a set, although it should be appreciated that since the headers 30 define the airfoil profile of a section of a wing, none of them will be identical in length or curvature. The headers 30 of the set are each attached to an individual post by attachment device 20 which is best illustrated in FIG. 7. This device 20 is fixedly connected to each post 18 and has a fixed, forwardly extending bracket portion 32 and a movable bar 34. Conventional nut and bolt assemblies 36 permit sandwiching of a given header 30 between bracket portion 32 and bar 34, which fixes the header onto the frame 12. The attachment devices 20 are positioned along the frame 12 so that they define a common or generic centerline axis for any skin panel to be assembled.

The slotted post guides 22, 24 and attachment device 20 align each header 30 perpendicular to the centerline axis. Each guide 22, 24 should be sufficiently close to its respective attachment point 20 so that they will align the shortest header 30 which is to be mounted on frame 12.

Figure 5:
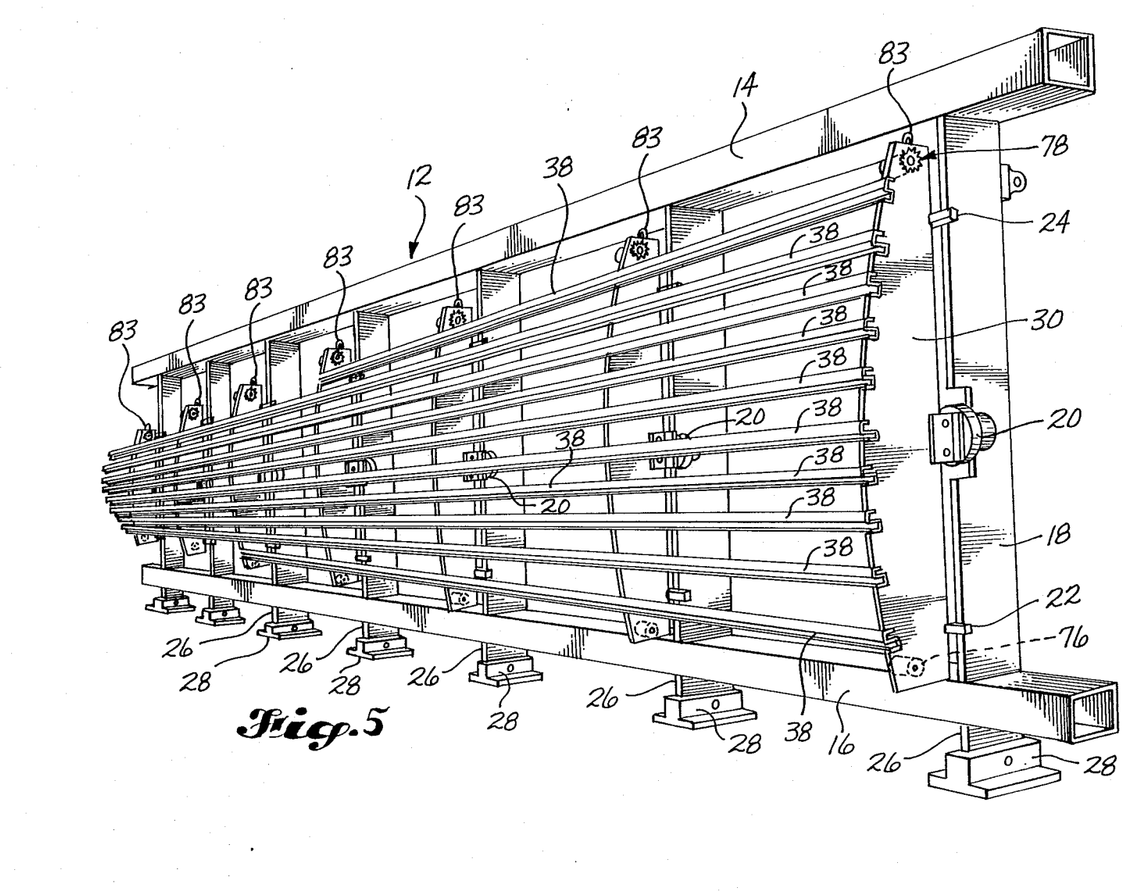
FIG. 5 is a view like FIGS. 2-4, but shows stringers transversely positioned in header edge recesses across the set of headers.

After the headers 30 are attached to the frame 12, as shown in FIG. 4, a plurality of stringers 38 are placed across the headers as shown in FIG. 5 (wherein reference numeral 38 is used to indicate each stringer). In order to accomplish this, and referring now to FIG. 11, each header 30 has a plurality of recessed areas, wherein for the purpose of simplicity, reference numeral 40 is used to indicate all recesses. The general construction of each stringer 38 would be familiar to a person skilled in the art. Basically, a "Z" stringer is illustrated in the drawings and it has top and bottom flange portions 42, 44 which are interconnected by a web portion 46. Both flanges 42, 44 have edge lips 48, 50 which respectively extend either downwardly or upwardly depending on the particular flange.

Figure 11:
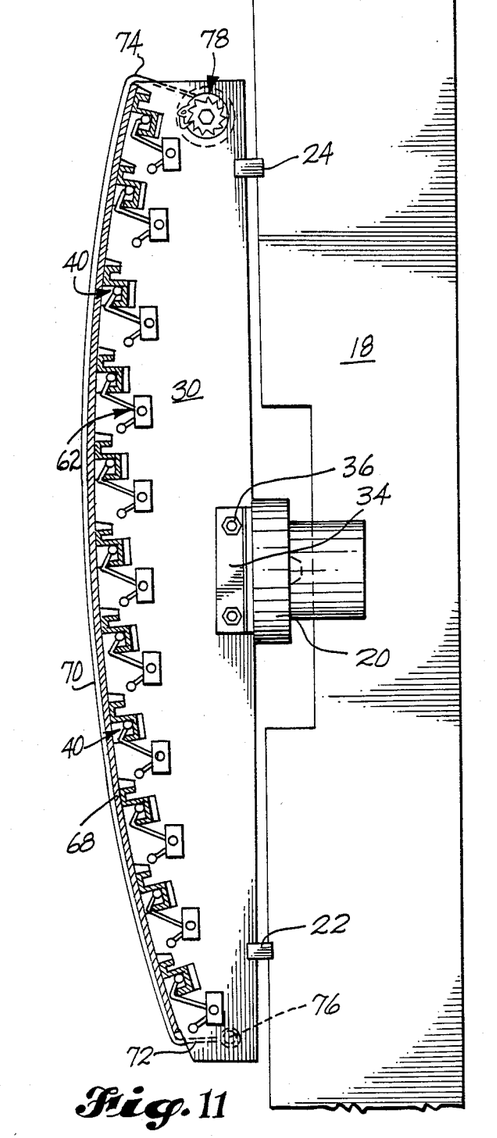
FIG. 11 is a side elevational view of one of the headers shown in FIGS. 1-5.
Figure 12:
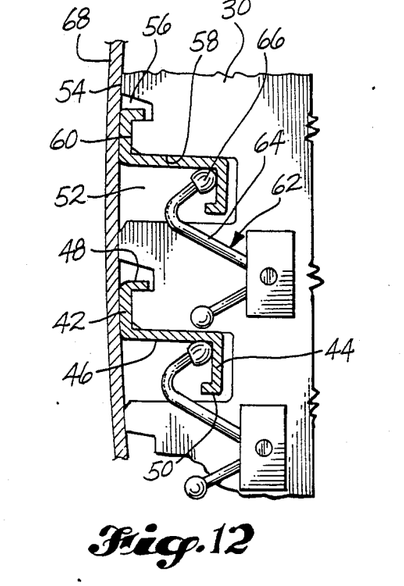
FIG. 12 is an enlarged fragmentary side view of two recesses or recessed areas in each header which receive a transverse portion of a stringer, and shows use of a clamping device to hold each stringer in true position.

Each recessed area 40 includes a first notch 52 which recedes into the header a certain distance from its edge 54. Notch 52 is sufficiently wide and deep so that it will receive all of stringer bottom flange 44 and web 46. For the particular style of stringer 38 shown in the drawings, each recess 40 further includes a second notch 56 that receives the upper flange's lip 48. Normally, the stringer's web 46 fits against a sidewall surface, or first surface, 58 of the first notch 52. Both notches 52, 56 are interconnected by a second surface 60 which is shaped to support the stringer's upper flange 42. This latter surface 60 is spaced below or inside the header's edge 54 a certain distance so that the upper flange 42 will be substantially contiguous with edge 54 when the stringer is positioned in recessed area 40. Once again, it should be borne in mind that the shape of each recessed area 50 would be changed for different styles of stringers.

Each recessed area 40 has a "destaco" clamping device 60, the purpose and operation of which would be familiar to a person skilled in the art. Briefly, this device 60 has a pivoting member 62 with an end portion 64 that applies a force against the stringer to clamp it in place inside notch 52.

Figure 2:
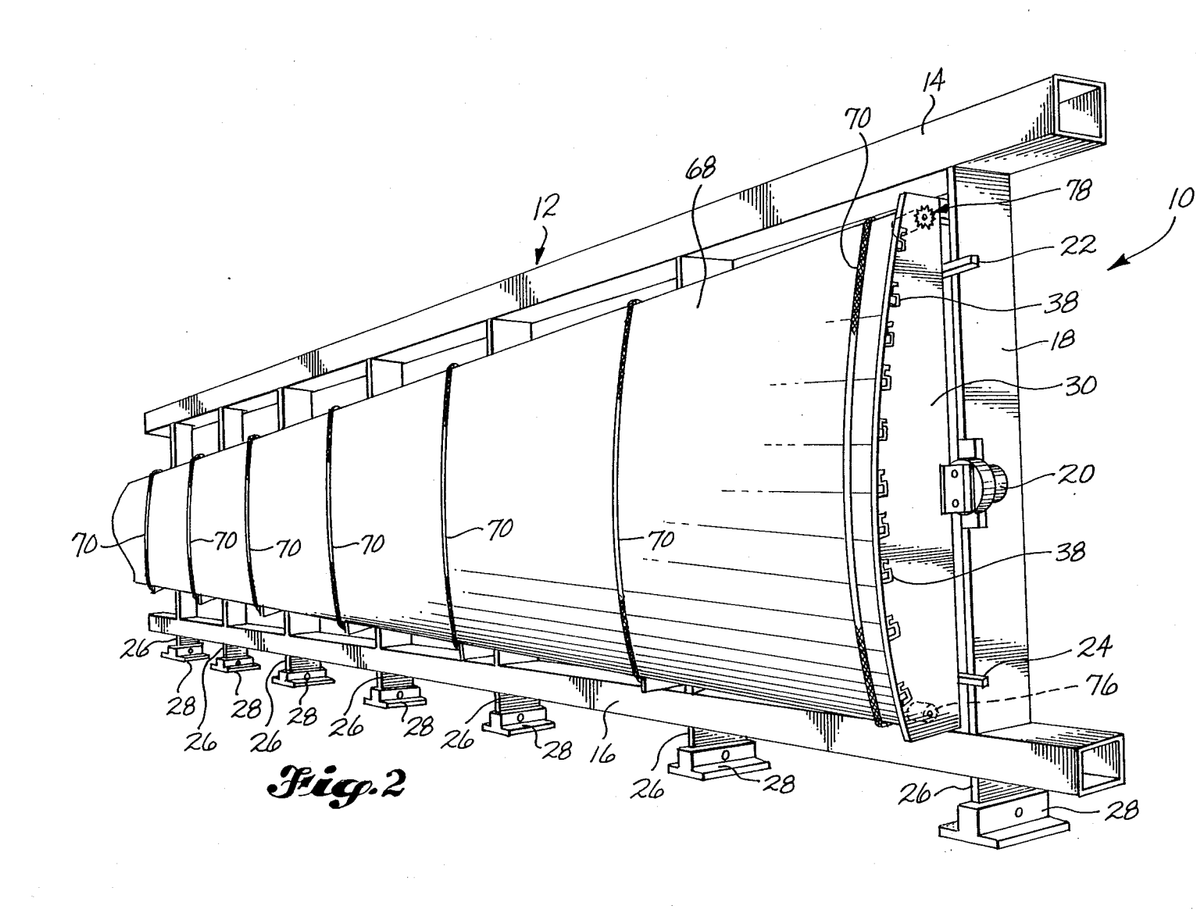
FIG. 2 is a pictorial view of the skin panel assembly jig shown in FIG. 1, but shows the jig mounted to an assembly frame which is seated in a floor space area.

Referring now to FIG. 2, after the stringers 38 are placed across the headers 30 a sheet of skin material 68 is then placed over the stringers. This is held in place by a plurality of webbings or straps, all of which are indicated by reference numeral 70. Each strap's opposite ends 72, 74 are connected directly to its respective header 30. Preferably, the strap's lower end 72 is connected to the header by means of a pin 76, fixed spool, or the like. Its upper end is connected to a rotatable cylindrical tensioning spool 78. This spool 78 has a ratchet wheel 80 that is held in a given rotational position by a pawl 82. Tightening the spool 78 in one direction thus tightens the webbing 70 against the skin 68, which further pulls the skin tightly against the stringers 38 and headers 30.

Figure 1:
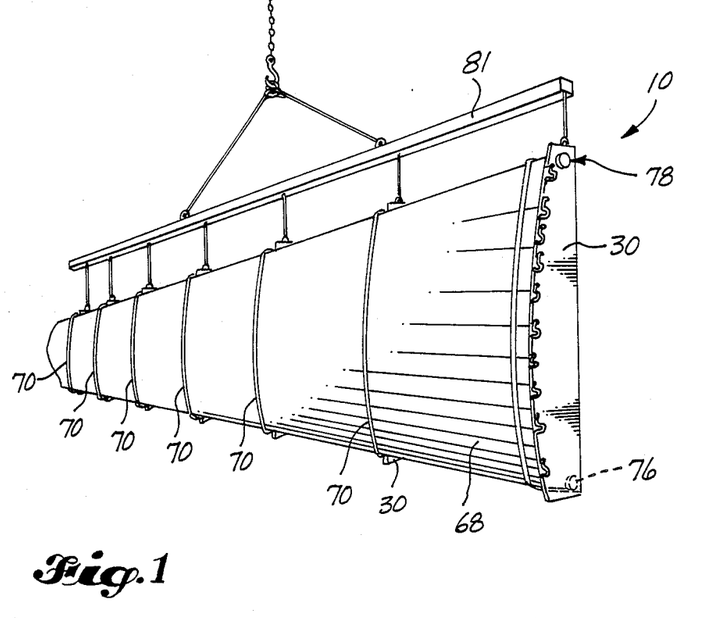
FIG. 1 is a pictorial view of a wing skin panel assembly jig constructed in accordance with a preferred embodiment of the invention, and shows the components of a skin panel assembly mounted to the jig as it is moved to another location where the panel's components are to be fastened together.

To summarize the invention, when a particular skin panel is to be assembled, a set of headers 30 is first attached to the frame 12. Then, the stringers 38 are placed across the headers in their respective edge recesses 40, and clamped in place by destaco clamps 62. After that, a skin sheet 68 is placed over the stringers 38 and is held in place by webbings 70 which are suitably tightened by ratcheting spools 78 on each header. This is followed by moving the entire assembly of headers 30, stringers 38 and skin sheet 68 to a location where the skin is to be fastened to the stringers, in the manner shown in FIG. 1. Preferably, a boom 81 lifted by an overhead crane (not shown) is used to lift the assembly 10 by attachment to each individual header as shown at 83 in FIG. 4. Of course, such movement is accomplished only after each header 30 is disconnected from its respective post 18 by loosening nut and bolt assemblies 36 of each attachment device 20.

Figure 6:
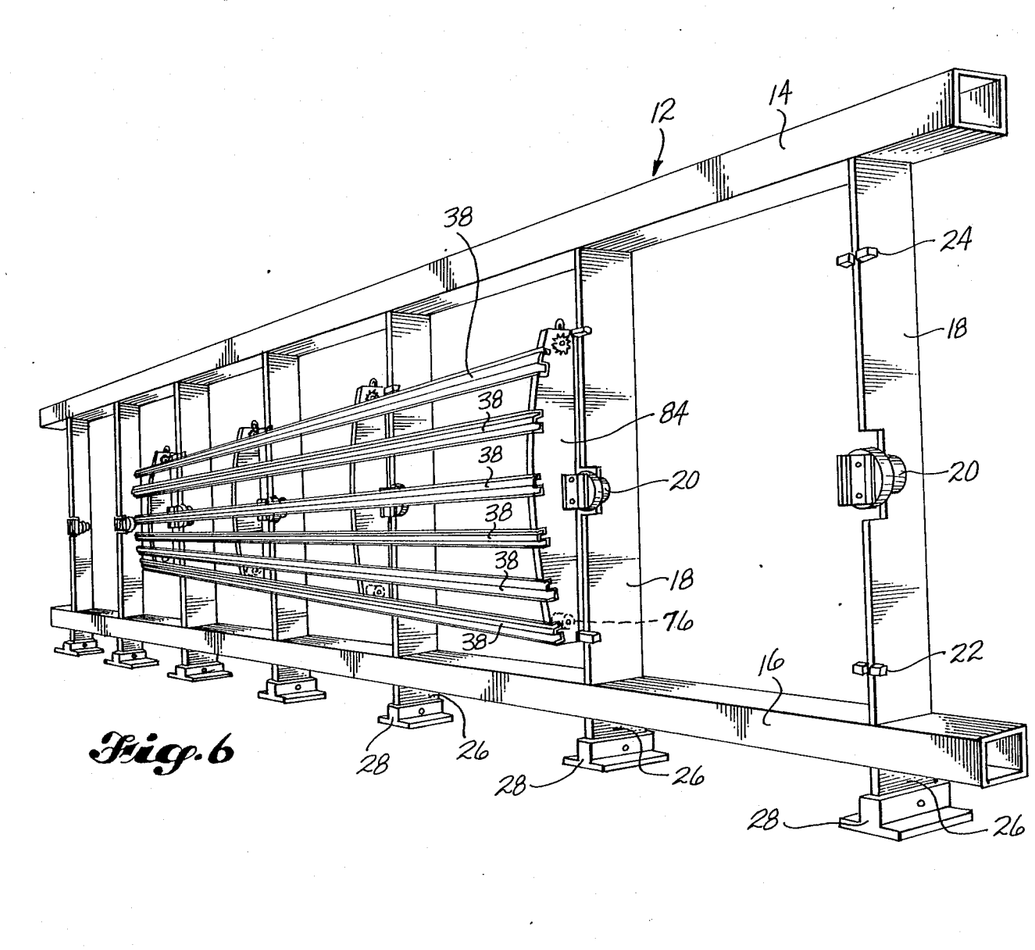
FIG. 6 is a view like FIG. 5, but shows a different set of headers mounted to the frame.

As mentioned above, an advantage to the jig 10 disclosed herein is that it may be used to construct more than one type of skin panel. The particular set of headers 30 described above can be easily replaced by a second set, such as the headers 84 shown in FIG. 6. This second set would cooperatively define the contour of a different skin panel.

It is to be appreciated the above description sets forth a preferred embodiment of the currently-known best mode for carrying out the invention. As such, it is to be understood that certain changes could be made to the jig assembly 10 described above without departing from the spirit and scope of the invention. Any patent protection due to the inventor or inventor's assignee is not to be defined and limited by the above description, but is to be defined and limited only by the patent claims which follow, wherein such claims are to be interpreted in accordance with the established doctrines of patent claim interpretation.

What is claimed is:

1. A method of using a single assembly jig for manufacturing wing skin panel sections consisting of a plurality of elongated stringers covered by a sheet of material, said method comprising:

defining a fixed centerline on said assembly jig, wherein said centerline is a common centerline for any panel section to be manufactured;

providing a plurality of sets of panel headers, each header of each set having a panel-forming edge curved to have the shape of at least a portion of a certain airfoil profile, said edge including a plurality of stringer registration recesses, each recess being shaped to receive a portion of a stringer, wherein the panel-forming edges of the headers in each respective set cooperatively define the airfoil profile of a separate skin panel section that is dedicated for use in connection with a certain wing;

providing a plurality of fixed header attachment points substantially along said centerline;

selecting a particular header set; followed by connecting each header in said selected set to said fixed header attachment points, in a manner so that said panel-forming edges of said selected set define the curvature of a particular skin panel section; followed by placing stringers across said selected set of headers, in a manner so that said stringers are received in said stringer registration recesses of said headers; followed by placing a skin sheet over said panel-forming edges of said selected set and said stringers; followed by placing webbing straps across the outer surface of said skin sheet, one webbing strap each being positioned adjacent a header in said selected set; followed by fastening each end of each webbing strap to its adjacent header, in a manner so that said webbing strap may be tightened across the outer surface of said skin sheet; followed by tightening said webbing straps, thereby forcing and holding said skin sheet against said stringers and said panel-forming edges of said selected set of headers; followed by detaching said selected set of headers from said fixed header attachment points; and moving said selected set of headers, with said stringers and said webbing-held skin sheet attached thereto, to an assembly location for fastening said skin sheet to said stringers.

* * * * *